(12) United States Patent
Salamitou

(10) Patent No.: US 6,345,537 B1
(45) Date of Patent: Feb. 12, 2002

(54) DEVICES FOR DETERMINING THE FLOW CHARACTERISTICS OF A MULTI-PHASE FLUID

(75) Inventor: Philippe F. Salamitou, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/335,069

(22) Filed: Jun. 17, 1999

(30) Foreign Application Priority Data

Jun. 25, 1998 (FR) .............................. 98 08076

(51) Int. Cl.$^7$ ................................ G01F 1/74
(52) U.S. Cl. .................................... 73/861.04
(58) Field of Search ................. 73/861.04, 861.02, 73/861.06, 861.12, 861.14, 861.15

(56) References Cited

U.S. PATENT DOCUMENTS

| | | |
|---|---|---|
| 4,063,153 A | 12/1977 | Dechene et al. |
| 4,509,366 A * | 4/1985 | Matsushita et al. ...... 73/861.02 |
| 4,752,727 A * | 6/1988 | Schneider ................. 324/61 P |
| 5,929,342 A * | 7/1999 | Thompson ............... 73/861.04 |

FOREIGN PATENT DOCUMENTS

| | | |
|---|---|---|
| EP | 0 280 814 A | 9/1988 |
| EP | 0 326 266 A | 8/1989 |

* cited by examiner

*Primary Examiner*—Benjamin R. Fuller
(74) *Attorney, Agent, or Firm*—John J. Ryberg; Brigitte L. Jeffery

(57) ABSTRACT

A capacitive device for measuring the dielectric constant of a two-phase fluid flowing along a pipe, this device comprising two electrodes and power supply system for applying an AC voltage across the two electrodes. A first one of these electrodes forms an excitation electrode disposed at the periphery of a measurement electrode, and the device further comprises apparatus for maintaining the electrodes at the same potential and for measuring the current (i) flowing between the excitation electrode and the measurement electrode, and apparatus for deducing the dielectric constant from the measured current. Application to measuring flow rates of water in hydrocarbon wells, in particular in hydrocarbon wells that slope.

12 Claims, 2 Drawing Sheets

DEVICES FOR DETERMINING THE FLOW CHARACTERISTICS OF A MULTI-PHASE FLUID

BACKGROUND OF THE INVENTION

1. Field of the Invention

The present invention relates to sensors and devices for determining the flow characteristics of a multi-phase fluid flowing along a pipe, and more particularly to such devices for measuring the dielectric constant of the fluid, the volume fraction or "holdup" of each of the components of the fluid, and the speed and the flow rate of each of the various phases.

2. Description of the Related Art

When monitoring wells for extracting hydrocarbons, it is important to be aware of the quantity of water produced simultaneously with the hydrocarbons.

To evaluate the water and hydrocarbon flow rates in homogeneous flows in pipes, three quantities must be estimated, namely, the mean water volume fraction $H_W$, the mean water speed $v_W$, and the mean hydrocarbon speed $v_o$. The flow rates are then as follows:

$$q_w = AH_W v_W$$

for the water; and $$q_o = A(1-H_W)v_o$$

for the hydrocarbon, where A is the section of the pipe.

When the flow is not homogeneous, which is possible in deviated wells, flow-rate evaluations based on the above equations are invalid. It is then necessary to take account of the effective distribution of the velocities and of the volume fractions across the section of the well. Such an approach means that a plurality of devices are placed across a given cross-section of the pipe.

It is also known that the speed of a flow in a pipe can be determined by measuring a magnitude that varies over time $s_1(t)$ and $s_2(t)$ at two different cross-sections of the pipe, and then by calculating a cross-correlation function:

$$C = <s_1(t)^* s_2(t)>$$

In a two-phase fluid, the fluctuations in the magnitude s(t) may, for example, be due to inhomogeneous structures propagating along the pipe at the mean speed of the flow.

If T is the value of t at the maximum of the cross-correlation function C, the speed v of the flow is given by:

$$v = L/T$$

where L is the axial distance between the two measurement sections.

It is also known, e.g. from U.S. Pat. No. 5,017,879, that capacitive devices can be used to determine the characteristics of multi-phase flows. The dielectric constant of a mixture of fluids depends on the respective fraction of each of its components and on their individual dielectric constants. It has thus been proposed to estimate the composition of a two-phase fluid on the basis of its dielectric constant.

The dielectric constant is itself obtained by exciting the fluid by means of electrodes separated by the fluid, in particular electrodes placed on the pipe, and across which an AC voltage is applied. The measured magnitude is the resulting current.

Guard electrodes have also been added to maintain the electrostatic field between the active electrodes. It is thus easier to interpret the measurements by limiting the edge effects due to the finite length of the active electrodes, or by focussing the electric field in a particular zone of the flow.

In both of the above-mentioned cases, namely when the flow is not homogeneous, or when the speed is measured, it is thus necessary to dispose a plurality of devices, in particular capacitive devices, close together on the pipe. Contradictory requirements then have to be faced.

It is desirable to use devices that are of small size. In a non-homogeneous flow, better resolution in space is thus obtained, thereby considerably improving the speed and the accuracy of the reconstruction algorithm. When speed is measured, the small size of the devices makes it possible to bring them closer together, and thus to obtain a correlation peak that is clearer for the resulting measurements, because the inhomogeneous structures deform to a lesser extent between the two devices.

Unfortunately, such a small size generally makes the measurements much more sensitive to electromagnetic noise. When the measurements are capacitive measurements, the measured capacitance values are low. Typically, the currents induced by the stray capacitance may be greater by several orders of magnitude than the current resulting from the capacitance to be measured. The stray capacitance thus gives rise to a systematic error or bias whose variations can exceed the amplitude of the signal itself.

An object of the present invention is to mitigate those drawbacks.

BRIEF SUMMARY OF THE INVENTION

More particularly, an object of the invention is to provide capacitive sensors for determining the characteristics of multi-phase flows, which sensors are of small size while being substantially insensitive to noise and thus substantially free from systematic error, as well as measurement devices including such sensors.

To this end, the invention firstly provides a capacitive sensor for determining the flow characteristics of a multi-phase fluid in a pipe, said sensor comprising at least one excitation electrode provided with at least one cutout in which at least one measurement electrode is disposed, said electrodes being organized to be applied against said pipe.

The invention also provides a device for capacitively measuring the dielectric constant of a multi-phase fluid flowing along a pipe, said device comprising at least one sensor as described above, means for maintaining said electrodes at the same potential and for measuring the current output by said measurement electrode, and means for deducing said dielectric constant from said current.

This configuration then makes it easy for all of the conductors liable to give rise to interference that are situated in the vicinity of the device in the detection system to be maintained at the potential of the excitation electrode. These conductors are thus at the same potential as the measurement electrode. The load thereon thus depends only on the potentials applied to the active electrodes.

Two embodiments are considered.

In a first embodiment, the excitation electrode is connected to the general ground of said power supply means. This solution is advantageously simple.

In the other embodiment, the excitation electrode constitutes the floating ground for said means for measuring the current. The advantage of this embodiment is that the signal can be brought by amplification to a level at which it dominates the common mode rejection voltage of the amplifier.

In this other embodiment, the means for measuring the current may comprise a first amplification stage referenced relative to the potential of the excitation electrode, and a second amplification stage organized to bring the reference of the output signal to the general ground.

More particularly, the device may include shielding electrically connected to the excitation electrode, around the measurement electrode and around said first amplification stage.

It should be observed that such a configuration does not require the first amplification stage to be located in the immediate vicinity of the measurement electrode. The shielding of said measurement electrode may be extended by a shielded cable along which a conductor passes that connects the measurement electrode to the amplification means which are themselves provided with shielding forming the following portion of the shielded cable.

Said excitation electrode may overlap the measurement electrode.

The invention further provides a device for capacitively measuring the volume fraction of a first component of a two-phase fluid flowing along a pipe, said device comprising at least one device as described above for measuring the dielectric constant of said fluid, and means for deducing said volume fraction from said dielectric constant.

It is known that, in a homogeneous mixture, and provided that the drops of a conductive fluid are immersed in an insulating fluid, the value of the dielectric constant $e_m$ is related to the value of the dielectric constant $e_o$ of the continuous phase and to the volume fraction $1-H_W$ of said continuous phase by the following relationship:

$$e_m = e_0 \frac{1}{(1-H_w)^3}$$

In a mixture of water and of hydrocarbon in a well, this relationship applies if the well is substantially vertical.

More particularly, such a volume fraction-measuring device may comprise a plurality of devices as described above for measuring the dielectric constant of said fluid, said devices in said plurality of devices being distributed over the periphery of a cross-section of said pipe.

It is then possible to obtain a section across the pipe. In a hydrocarbon well, the above relationship is no longer applicable but it is no longer necessary for the well to be vertical.

The invention also provides a capacitive device for measuring the speed of a two-phase fluid flowing along a pipe, said device comprising at least two devices as described above for measuring the dielectric constant of said fluid, the devices being disposed in different cross-sections of said pipe, and means for establishing a cross-correlation between the measurements delivered by said two devices and for deducing said speed therefrom.

More particularly, said at least two devices for measuring the dielectric constant of said fluid are disposed substantially along the same generator line of said pipe, and they have a common excitation electrode.

Since the signal does no have any systematic error, the measurement electrodes may be small. Typically, the electrodes may have dimensions of about one centimeter. Furthermore, the common excitation electrode guarantees that the monitored zone is homogeneous. Finally, no minimum gap is necessary between the various measurement electrodes associated with the same excitation electrode.

The invention further provides a device for capacitively measuring the flow rate of a two-phase fluid flowing along a pipe, said device comprising at least one device as described above for measuring the volume fraction of a first component of said fluid, at least one device as described above for measuring the speed of said first component, and means for deducing said flow rate therefrom.

Naturally, the device for measuring the volume fraction, and the device for measuring the speed may use the same electrodes.

The invention also provides a method of measuring the dielectric constant of a two-phase fluid flowing along a pipe, said method comprising the steps of placing two electrodes on either side of a portion of said fluid, and applying an AC voltage across the two electrodes, wherein at least one excitation electrode is provided with at least one cutout in which at least one measurement electrode is disposed, and further comprising the steps of maintaining said excitation electrode and said measurement electrode at the same potential, measuring the current flowing between said electrodes, and deducing said dielectric constant from said current.

Particular embodiments of the invention are described below by way of non-limiting example and with reference to the accompanying diagrammatic drawings, in which:

DETAILED DESCRIPTION OF THE INVENTION

Figure 1:
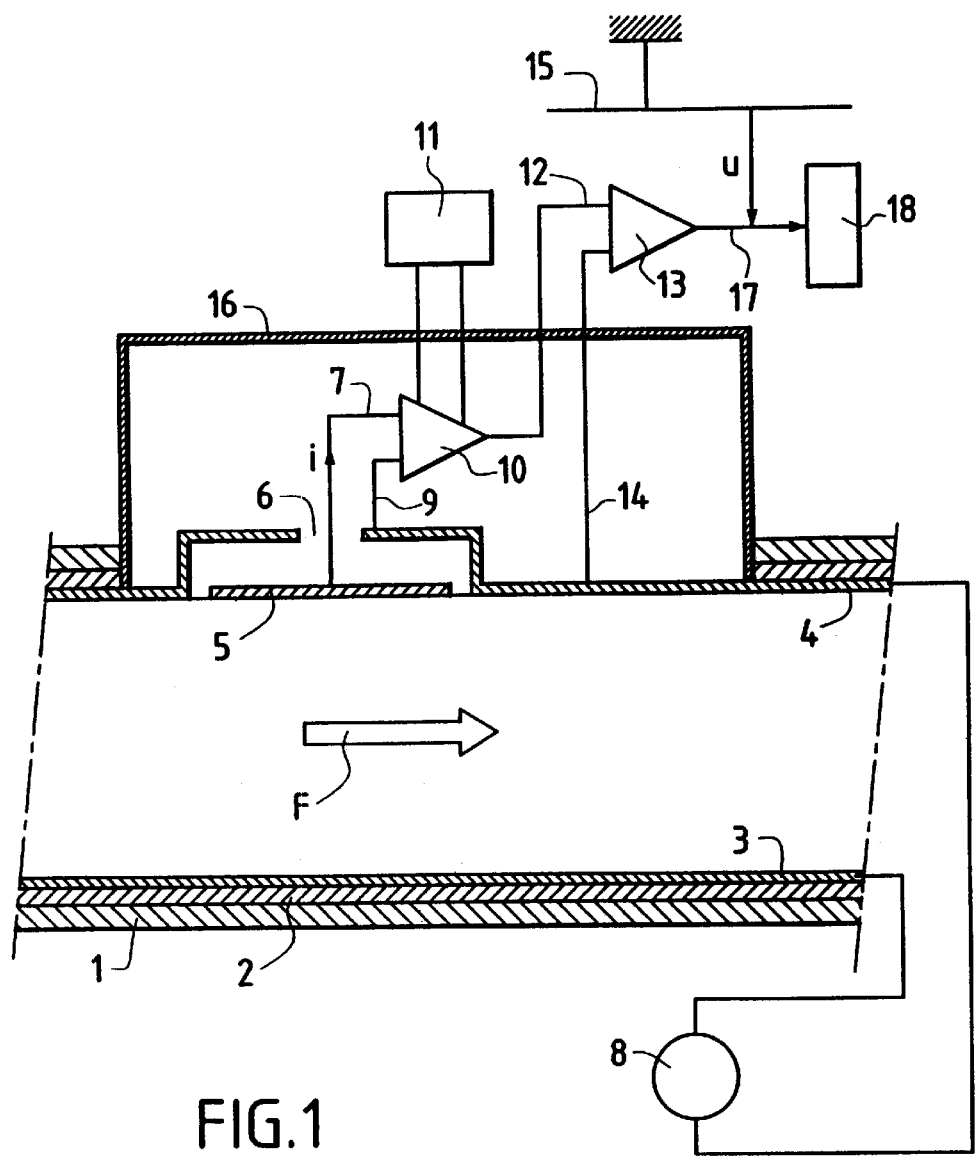
FIG. 1 is an electric circuit diagram of a device of the invention for measuring the dielectric constant of a two-phase fluid.

FIG. 1 shows a pipe which is shown horizontal but which could be vertical or deviated. The pipe is made up of a metal tube 1 designed to withstand pressure and internally lined with an insulating material 2. A two-phase fluid made up of hydrocarbons and of water, represented by arrow F, flows along the pipe 1.

Figure 5:
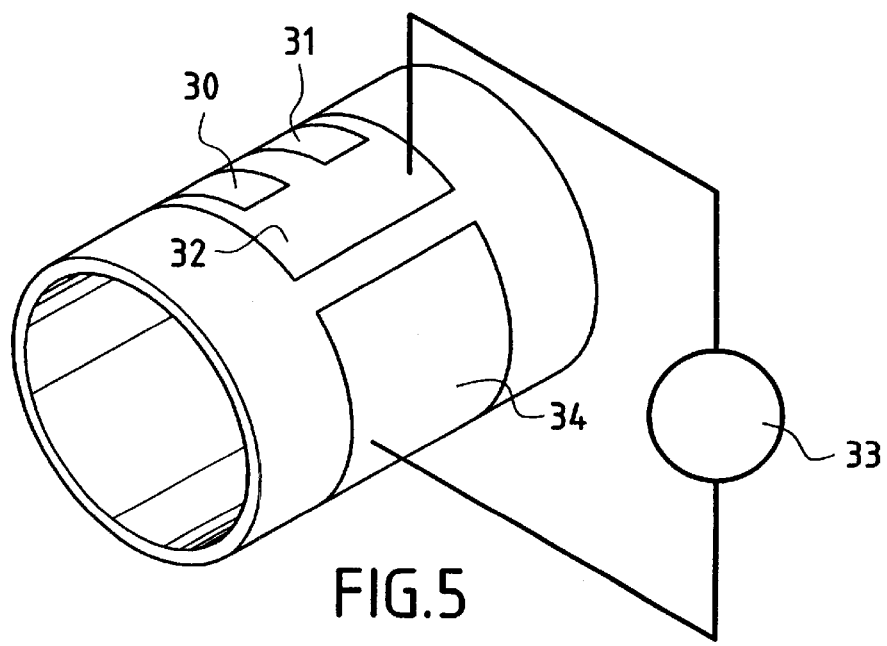
FIG. 5 shows how devices of the type shown in FIG. 1 are used to perform flow-rate measurements.

Two active electrodes 3 and 4 are disposed facing each other on the inside surface of the pipe, thereby substantially forming two semi-cylindrical half-sleeves (as also shown in FIG. 5). The electrode 3 is uninterrupted, whereas the "excitation" electrode 4 is cut to allow space in contact with the tube for a measurement electrode 5 from which the excitation electrode is electrically insulated. The electrode 4 overlaps most of the measurement electrode 5 and is merely provided with an orifice 6 for passing a conductor 7 connected to the measurement electrode 5.

A voltage generator 8 whose output terminals are connected to the electrodes 3 and 4 delivers an AC voltage across said electrodes.

The conductor 7 and a conductor 9 connected to the electrode 4 are connected to the input of an amplifier 10 fed with DC from a power supply 11. The amplifier maintains the electrodes 4 and 5 at the same potential. The output 12 of the amplifier 10 is connected to an input of an instrumentation amplifier 13 whose other input receives a conductor 14 connected to the electrode 4.

The two amplifiers 10 and 13 thus form the first two stages of an amplification system for amplifying the current i delivered by the measurement electrode 5. The first stage has a floating ground referenced relative to the potential of the electrode 4, whereas the second stage is referenced to the general ground 15. The output voltage U of amplifier 13, relative to the general ground 15, is proportional to the current i.

It can be observed that shielding 16 connected to the electrode 4 covers and isolates the entire first amplification stage 10, thereby contributing to further reducing the crosstalk between the device and the excitation, which crosstalk is already limited considerably by the fact that all of the conductors situated in the vicinity of the measurement electrode 5 are at the same potential as said measurement electrode.

The output 17 of the amplification system is connected to the input of a processing unit 18. The processing unit 18 shapes the output signal, digitizes it, and deduces the capacitance of the capacitor made up of the electrode 3 and of the measurement electrode 5 from the AC voltage delivered by the generator and from the resulting current i. Knowing the geometry of the capacitor, the unit 18 can then determine the dielectric constant of the two-phase fluid, and calculate the water volume fraction by the above-mentioned relationship:

$$e_m = e_0 \frac{1}{(1-H_w)^3}$$

Figure 2:
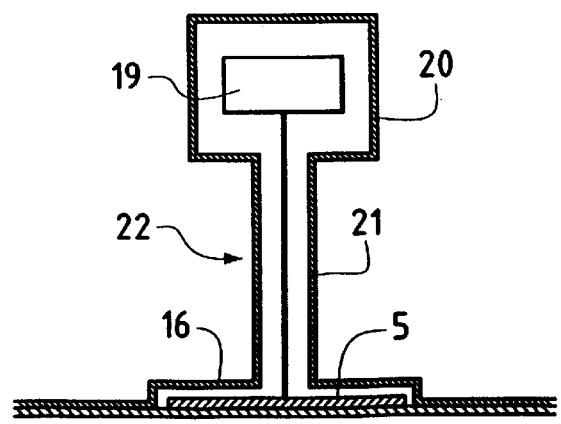
FIG. 2 shows a variant of the device shown in FIG. 1.

In another embodiment, shown in FIG. 2, the amplification and measurement electronic circuitry is no longer situated at the measurement electrode 5, but rather it is situated a certain distance away therefrom In which case, the electronic circuitry 19 is disposed in shielding 20 connected to the shielding 16 of the measurement electrode 5 by a braid 21 of a coaxial cable 22. The conductor 7 is then brought to the electronic circuitry 19 in the cable 22.

In the case shown in FIG. 2, the excitation electrode 4 is connected to the general ground of the power supply means. If a floating ground were provided for the current-measuring means, the equivalent of the conductor 14 shown in FIG. 1 would also be brought along the cable 22.

Figure 3:
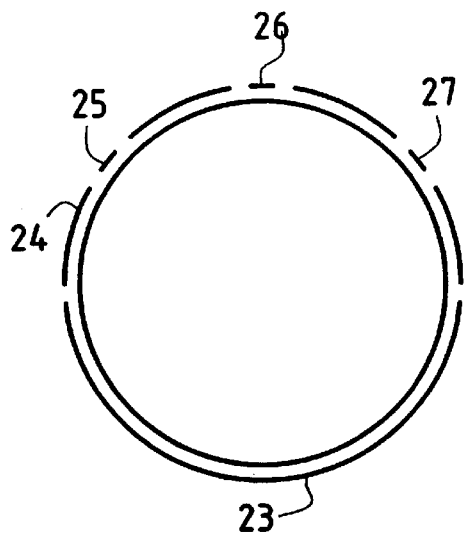
FIG. 3 shows how devices of the type shown in FIG. 1 are used to obtain cross-sections, e.g. of volume fraction distribution.
Figure 4:
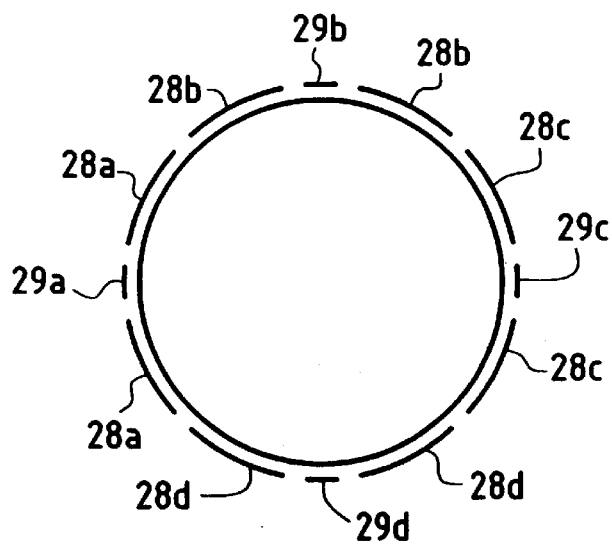
FIG. 4 shows another embodiment of the arrangement shown in FIG. 3.

When the fluid is not homogeneous, which occurs, for example, in a deviated well having a low flow rate, the configurations shown in FIGS. 3 and 4 may be chosen.

The embodiment shown in FIG. 3 is similar to that shown in FIG. 1. A semi-cylindrical electrode 23 corresponds to the electrode 3, and an excitation electrode 24 corresponds to the excitation electrode 4.

However, in this embodiment, the excitation electrode 24 is provided with three cutouts into which three measurement electrodes 25, 26, and 27 are inserted. The three measurement electrodes are disposed in the same cross-section of the pipe, and they are uniformly distributed over one half of the circumference of said cross-section. Naturally, a larger number of measurement electrodes may be provided.

In the embodiment shown in FIG. 4, four independent sensors are provided, each of which comprises a respective excitation electrode 28a–28d provided with a cutout in which a respective measurement electrode 29a–29d is included.

The outputs of all of the sensors are connected to the input of a processing unit (not shown) which, by calculations within the purview of a person skilled in the art, provides a section of the distribution of the water volume fraction in the fluid across the pipe.

FIG. 5 shows a device similar to the FIG. 1 device, except that it comprises two measurement electrodes 30 and 31 disposed on the same generator line of a pipe, and included in respective cutouts in the same excitation electrode 32. As above, the electricity generator 33 applies an AC voltage across the electrode 32 and an opposite electrode 34.

As indicated above, cross-correlation of the signals collected at the measurement electrodes 30 and 31 gives the speed at which the inhomogeneous structures are displaced between the measurement electrodes 30 and 31, and thus the mean speed of the flow along the pipe.

Naturally, the two embodiments shown in FIGS. 2 and 3 may be combined to deliver as many flow characteristics as possible.

It can be observed that the above-described devices are particularly robust, since they include no moving parts. They are therefore particularly well suited to use in petroleum extraction, in particular in downhole applications, especially in offshore applications.

What is claimed is:

1. A device for capacitively measuring the dielectric constant of a two-phase fluid flowing along a pipe, comprising:
   at least one capacitive sensor comprising at least one excitation electrode which part of the surface defines a cutout to allow free space in which at least one measurement electrode is disposed, said electrodes being arranged to be applied against said pipe;
   power supply means connected to the excitation electrode of said capacitive sensor in order to apply an AC voltage to said excitation electrode;
   amplification means connected to both the excitation electrode and the measurement electrode in order to maintain said electrodes at the same potential and capacitively measure the current (i) output by said measurement electrode; and
   deducing means connected to said amplification means in order to deduce said dielectric constant from said current (i).

2. A device according to claim 1, in which said excitation electrode is connected to the general ground of said power supply means.

3. A device according to claim 1, in which an electrode is connected to the general ground of said power supply means, a floating ground being provided for said amplifying means for measuring the current.

4. A device according to claim 3, in which said amplifying means for measuring the current comprise a first amplification stage referenced relative to the potential of the excitation electrode, and a second amplification stage organized to bring the reference of the output signal to the general ground.

5. A device according to claim 4, including shielding electrically connected to the excitation electrode, around the measurement electrode and around said first amplification stage.

6. A device according to claim 1, in which said excitation electrode covers the measurement electrode.

7. A device for capacitively measuring the volume fraction of a first fluid in a two-phase fluid flowing along a pipe, comprising:

at least one device for capacitively measuring the dielectric constant of said fluid, said device comprising:
  at least one capacitive sensor comprising at least one excitation electrode which part of the surface defines a cutout to allow free space in which at least one measurement electrode is disposed, said electrodes being arranged to be applied against said pipe;
  power supply means connected to the excitation electrode of said capacitive sensor in order to apply an AC voltage to said excitation electrode;
  amplification means connected to both the excitation electrode and the measurement electrode in order to maintain said electrodes at the same potential and capacitively measure the current (i) output by said measurement electrode;
  calculating means connected to said amplification means in order to deduce said dielectric constant from said current (i) and calculate said volume fraction from said dielectric constant.

8. A device according to claim 7, comprising a plurality of devices for capacitively measuring the dielectric constant of said fluid, said plurality of devices being distributed over the periphery of a cross-section of said pipe.

9. A capacitive device for measuring the speed of a two-phase fluid flowing along a pipe, comprising:
  at least two devices that are disposed in different cross-sections of said pipe, said devices comprising:
    at least one capacitive sensor comprising at least one excitation electrode which part of the surface defines a cutout to allow free space in which at least one measurement electrode is disposed, said electrodes being arranged to be applied against said pipe;
    power supply means connected to the excitation electrode of said capacitive sensor in order to apply an AC voltage to said excitation electrode;
    amplification means connected to both the excitation electrode and the measurement electrode in order to maintain said electrodes at the same potential and capacitively measure the current (i) output by said measurement electrode; and
    deducing means connected to said amplification means in order to deduce said dielectric constant from said current (i); and
  correlating means connected to both of said two devices in order to establish a cross-correlation between the measurements delivered by said two devices and for deducing said speed therefrom.

10. A device according to claim 9, in which said at least two devices are disposed substantially along the same generator line of said pipe, and have a common excitation electrode.

11. A device for capacitively measuring the flow rate of a fluid in a two-phase fluid flowing along a pipe, comprising
  at least one device for capacitively measuring the volume fraction of a said fluid, comprising:
    at least one device for capacitively measuring the dielectric constant of said fluid, said device including at least one capacitive sensor comprising at least one excitation electrode which part of the surface defines a cutout to allow free space in which at least one measurement electrode is disposed, said electrodes being arranged to be applied against said pipe; power supply means connected to the excitation electrode of said capacitive sensor in order to apply an AC voltage to said excitation electrode; amplification means connected to both the excitation electrode and the measurement electrode in order to maintain said electrodes at the same potential and capacitively measure the current (i) output by said measurement electrode; and calculating means connected to said amplification means in order to deduce said dielectric constant from said current (i) and calculate said volume fraction from said dielectric constant;
  at least one capacitive device for measuring the speed of a two-phase fluid flowing along a pipe, comprising:
    at least two devices that are disposed in different cross-sections of said pipe, said two devices including at least one capacitive sensor comprising at least one excitation electrode which part of the surface defines a cutout to allow free space in which at least one measurement electrode is disposed, said electrodes being arranged to be applied against said pipe; power supply means connected to the excitation electrode of said capacitive sensor in order to apply an AC voltage to said excitation electrode; amplification means connected to both the excitation electrode and the measurement electrode in order to maintain said electrodes at the same potential and capacitively measure the current (i) output by said measurement electrode; deducing means connected to said amplification means in order to deduce said dielectric constant from said current (i);
  and correlating means connected to said capacitive device for measuring the speed, in order to establish a cross-correlation between the measurements delivered by capacitive device and to deduce said speed and thus said flow rate therefrom.

12. A method of measuring the dielectric constant of a two-phase fluid flowing along a pipe, said method comprising the steps of placing two electrodes on either side of a portion of said fluid, and applying an AC voltage across the two electrodes, wherein at least one excitation electrode has part of its surface that defines a cutout to allow free space in which at least one measurement electrode is disposed, and further comprising the steps of maintaining said excitation electrode and said measurement electrode at the same potential, measuring the current flowing between said electrodes, and deducing said dielectric constant from said current.

* * * * *